(12) United States Patent
Chin et al.

(10) Patent No.: US 9,979,221 B2
(45) Date of Patent: May 22, 2018

(54) CONTEXTUAL ASSISTANCE FOR WIRELESS CHARGING

(71) Applicant: Verizon Patent and Licensing Inc., Arlington, VA (US)

(72) Inventors: John P. Chin, Upper Montclair, NJ (US); Graham David Sysko, Cambridge, MA (US); Denise Nicole Lyn-Shue, Cambridge, MA (US); Bradford A. Jackvony, Wakefield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 254 days.

(21) Appl. No.: 14/804,852

(22) Filed: Jul. 21, 2015

(65) Prior Publication Data
US 2016/0380464 A1    Dec. 29, 2016

Related U.S. Application Data

(60) Provisional application No. 62/184,166, filed on Jun. 24, 2015.

(51) Int. Cl.
*H02J 7/00*    (2006.01)
*H02J 7/02*    (2016.01)

(52) U.S. Cl.
CPC .................................... *H02J 7/025* (2013.01)

(58) Field of Classification Search
CPC .. H02J 50/90; H02J 50/10; H02J 50/12; H02J 7/025
USPC .......................................... 320/108; 307/104
See application file for complete search history.

(56) References Cited

U.S. PATENT DOCUMENTS

| | | | | |
|---|---|---|---|---|
| 2004/0201361 A1* | 10/2004 | Koh | ...................... | H02J 7/0042 320/104 |
| 2014/0035517 A1* | 2/2014 | Dunko | ................... | H02J 5/005 320/108 |
| 2015/0035480 A1* | 2/2015 | Shichino | ................. | H02J 7/025 320/107 |
| 2015/0195399 A1* | 7/2015 | Way | ................. | H04M 1/72577 455/418 |

(Continued)

FOREIGN PATENT DOCUMENTS

KR    101257676 B1 *  5/2013  .............. H02J 50/10

OTHER PUBLICATIONS

Sacco, "Is Samsung's new Wireless Charging Pad worth the price?", http://www.cio.com/article/2912623/consumer-technology/is-samsungs-new-wireless-charging-pad-worth-the-price.html, CIO, Apr. 22, 2015, 6 pages.

(Continued)

*Primary Examiner* — Drew A Dunn
*Assistant Examiner* — Zixuan Zhou

(57) ABSTRACT

A device may identify a wireless charging device within a threshold proximity to the device. The device may provide information associated with aligning the device and the wireless charging device. The device may determine that the wireless charging connection is enabled with the wireless charging device based on providing information associated with aligning the device and the wireless charging device. The device may determine a charging status associated with the wireless charging connection. The device may provide information identifying the charging status.

20 Claims, 12 Drawing Sheets

(56) References Cited

U.S. PATENT DOCUMENTS

2016/0218545 A1* 7/2016 Schroeder ............... H02J 7/025

OTHER PUBLICATIONS

John V., "Nokia DT-903 Smart Wireless Charging Plate Review", http://www.phonearena.com/reviews/Nokia-DT-903-Smart-Wireles-Charging-Plate-Review_id3943, PhoneArena, Feb. 3, 2015, 3 pages.

* cited by examiner

CONTEXTUAL ASSISTANCE FOR WIRELESS CHARGING

RELATED APPLICATION(S)

This application claims priority under 35 U.S.C. § 119 to U.S. Provisional Patent Application No. 62/184,166, filed on Jun. 24, 2015, the content of which is incorporated by reference herein in its entirety.

BACKGROUND

A wireless charging device (e.g., an inductive charger) may utilize an electromagnetic field to transfer energy to a mobile device (e.g., to a battery of the mobile device via inductive coupling) without the mobile device being attached to the wireless charging device (e.g., via a charging wire). The mobile device may be positioned within a particular proximity of the wireless charging device to be charged by the wireless charging device.

DETAILED DESCRIPTION OF PREFERRED EMBODIMENTS

The following detailed description of example implementations refers to the accompanying drawings. The same reference numbers in different drawings may identify the same or similar elements.

A mobile device may utilize a wireless charging device to facilitate charging. For example, the mobile device may be positioned within a particular proximity to the wireless charging device, such as being positioned on a pad of the wireless charging device, and may utilize inductive charging (e.g., via inductive coupling) to receive energy. The particular proximity may require an alignment to a tolerance of approximately four millimeters from a charging component of the wireless charging device. However, achieving an alignment may be difficult for some users. Implementations, described herein, may provide contextual information and/or selectively alter configuration settings to facilitate wireless charging of a mobile device by a wireless charging device.

Figure 1:
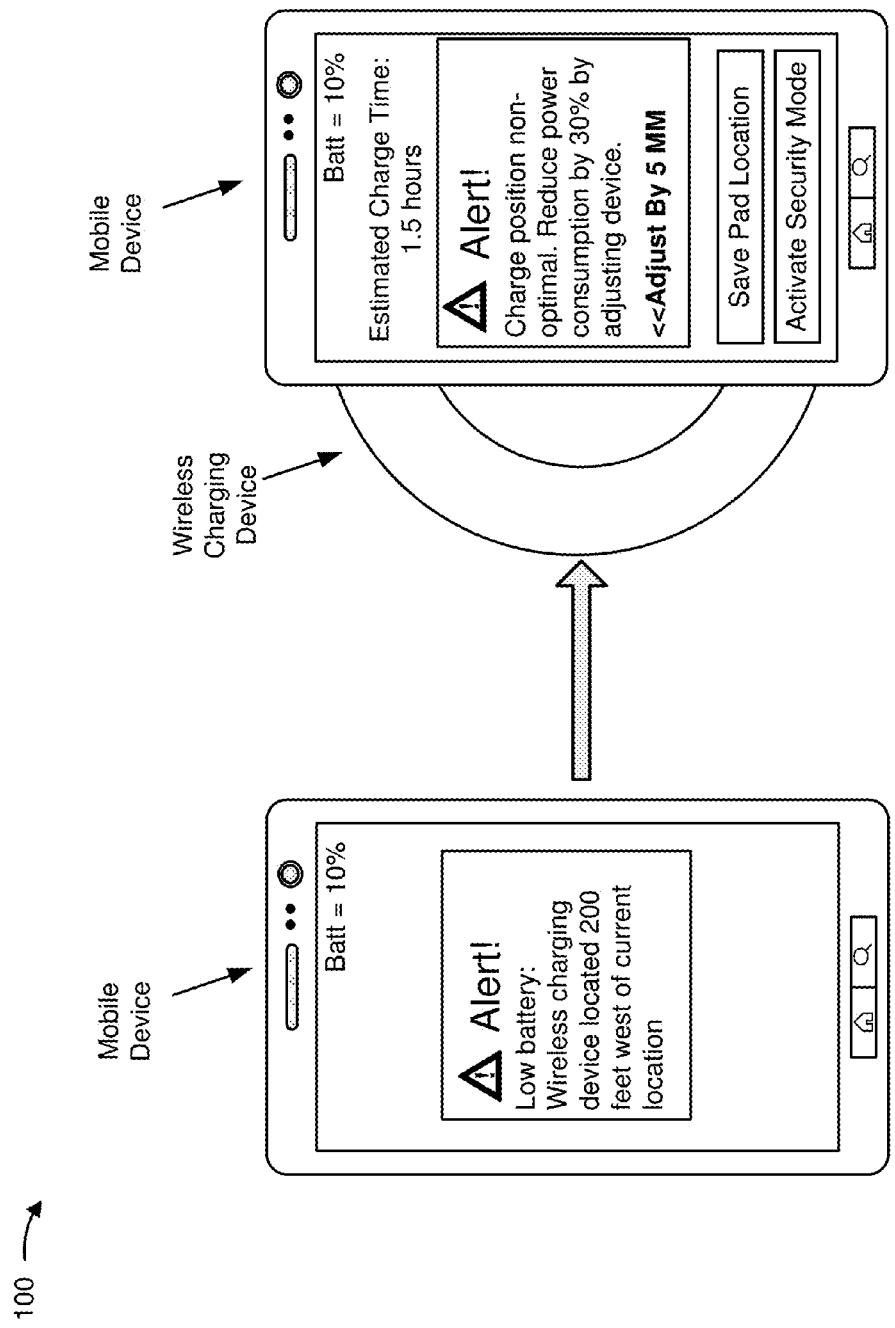
FIG. 1 is a diagram of an overview of an example implementation described herein.

FIG. 1 is a diagram of an overview of an example implementation 100 described herein. As shown in FIG. 1, a mobile device may receive a trigger to locate a wireless charging device. For example, the mobile device may determine that a battery level satisfies a low-battery threshold (e.g., 10% battery charge, 20% battery charge, or the like). The mobile device may determine the location of the wireless charging device based on determining that the battery level satisfies the low-battery threshold. For example, the mobile device may obtain stored information regarding the location of the wireless charging devices, receive information from a network identifying the location for the wireless charging device, detect a beacon from the wireless charging device (e.g., a signal generated by the wireless charging device that identifies a proximity to the wireless charging device, the location of the wireless charging device, etc., such as a Bluetooth beacon, a WLAN beacon, etc.), or the like. The mobile device may generate an alert for a user, indicating that the low-battery threshold is satisfied and identifying the location of the wireless charging device. In this way, the mobile device may assist a user in locating a wireless charging device, thereby increasing a likelihood that the mobile device remains charged.

As further shown in FIG. 1, a user may attempt to position the mobile device on a surface of the wireless charging device to facilitate wireless charging. The mobile device may determine that the mobile device is poorly aligned to the wireless charging device. Poor alignment and/or improper alignment may refer to alignment that results in a reduced charging efficiency relative to an improved and/or proper alignment to the wireless charging device (e.g., being aligned more accurately with a charging component of the wireless charging device). A reduced charging efficiency associated with poor alignment may be associated with greater energy consumption by the wireless charging device, increased charging time, or the like relative to another charging efficiency associated with proper alignment. The mobile device may provide, via the user interface, information associated with aligning the mobile device. For example, the mobile device may provide information indicating an adjustment that results in improved alignment relative to the poor alignment, such as a direction in which to move the mobile device, a distance to which to move the mobile device, an improved power consumption relative to a power consumption using the poor alignment, or the like. Additionally, or alternatively, the mobile device may display an image illustrating a proper alignment of the mobile device (e.g., an image associated with a type of the mobile device and a type of the wireless charging device), selected from a set of images illustrating proper alignments of the mobile device with one or more types of wireless charging devices. In this way, the mobile device may provide alignment assistance to a user, thereby facilitating increased charging efficiency relative to a poorly aligned mobile device and wireless charging device.

The mobile device may adjust one or more configurations based on detecting an alignment to the wireless charging device. For example, the mobile device may alter a notification setting to disable vibration based alerts, thereby reducing a likelihood that a vibration alert causes the mobile phone to move relative to the wireless charging device and become improperly aligned to the wireless charging device. Additionally, or alternatively, the mobile device may cause a wireless charging device that includes a magnetic attachment to increase a force level of the magnetic attachment to reduce a likelihood of the mobile device from becoming improperly aligned to the wireless charging device. Additionally, or alternatively, the mobile device may provide alerts when the mobile device is removed from the wireless charging device, such as when another user attempts to steal the mobile device, when the mobile device is accidentally moved out of alignment, or the like. In this way, the mobile device may provide information to a user that the mobile device may need adjustment on the wireless charging device, may have been stolen, or the like, thereby improving user experience with a wireless charging device relative to a mobile device that does not adjust one or more configurations based on detecting an alignment to a wireless charging device.

Figure 2:
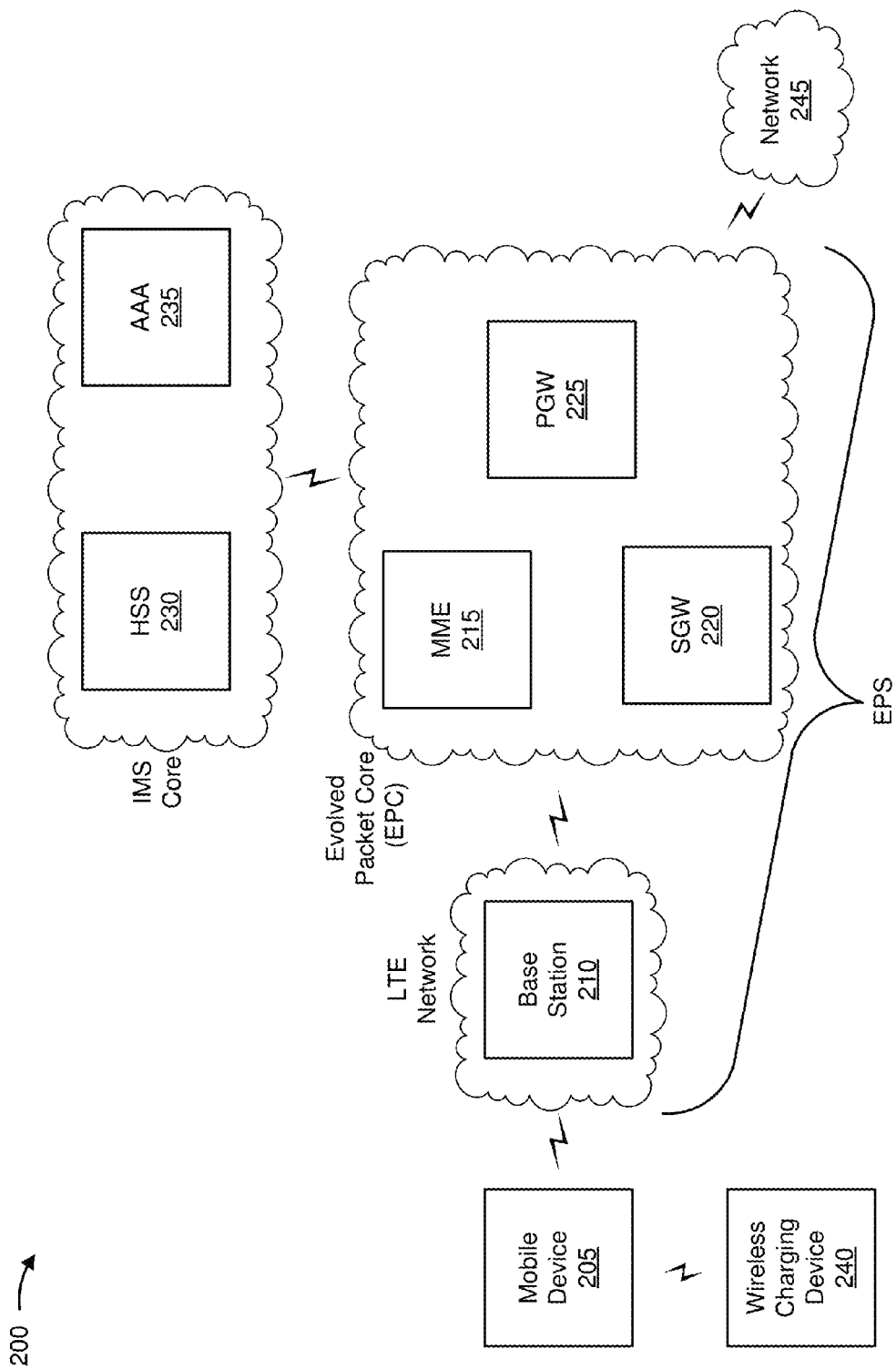
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a wireless charging device 240; and a network 245. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile device 205 communicates with the EPC. The EPC may include MME 215, SGW 220, and/or PGW 225 that enable mobile device 205 to communicate with network 245 and/or an Internet protocol (IP) multimedia subsystem (IMS) core. The IMS core may include HSS 230 and/or AAA 235, and may manage device registration and authentication, session initiation, etc., associated with mobile devices 205. HSS 230 and/or AAA 235 may reside in the EPC and/or the IMS core.

Mobile device 205 may include one or more devices capable of communicating with base station 210 and/or a network (e.g., network 245). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Mobile device 205 may send traffic to and/or receive traffic from network 245 (e.g., via base station 210, SGW 220, and/or PGW 225). In some implementations, mobile device 205 may be charged by wireless charging device 240 via a wireless charging connection (e.g., an inductive charging connection via inductive coupling). The wireless charging connection may be associated with a status, such as whether wireless charging is enabled, an efficiency of the wireless charging connection, or the like. In some implementations, mobile device 205 may transmit information to and/or receive information from wireless charging device 240, such as via a local area connection (e.g., a Bluetooth connection, a wireless local area connection, or the like), via network 245, or the like.

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may send traffic to and/or receive traffic from wireless charging device 240, thereby facilitating a network connection for wireless charging device 240. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. SGW 220 may also receive traffic from network 245 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to mobile device 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with mobile device 205. For example, HSS 230 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with mobile device 205. For example, AAA 235 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

Wireless charging device 240 may include one or more devices associated with wirelessly charging mobile device 205. For example, wireless charging device 240 may include an inductive wireless charger (e.g., a Qi specification charging device, a Power Matters Alliance (PMA) specification charging device, or the like), a conductive wireless charger (e.g., an Open Dots Alliance (ODA) specification charging device or the like), or another type of wireless charging device. In some implementations, wireless charging device 240 may include an attachment functionality, such as a magnetic attachment functionality associated with maintaining an alignment to mobile device 205. In some implementations, wireless charging device 240 may transmit information to and/or receive information from one or more other devices, such as mobile device 205, base station 210, or the like.

Network 245 may include one or more wired and/or wireless networks. For example, network 245 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
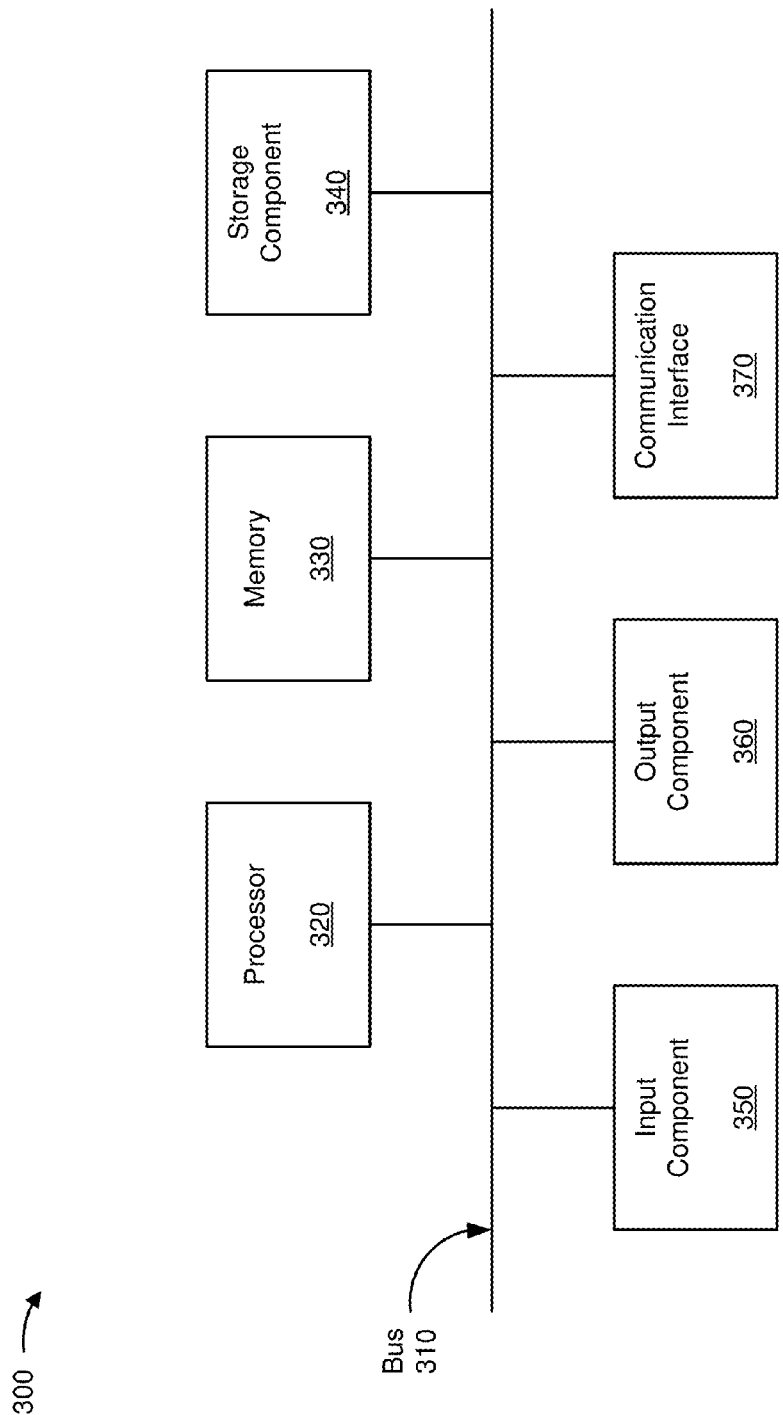
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, HSS 230, AAA 235, and/or wireless charging device 240. In some implementations, mobile device 205, base station 210, MME 215, SGW 220, PGW 225, HSS 230, AAA 235, and/or wireless charging device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
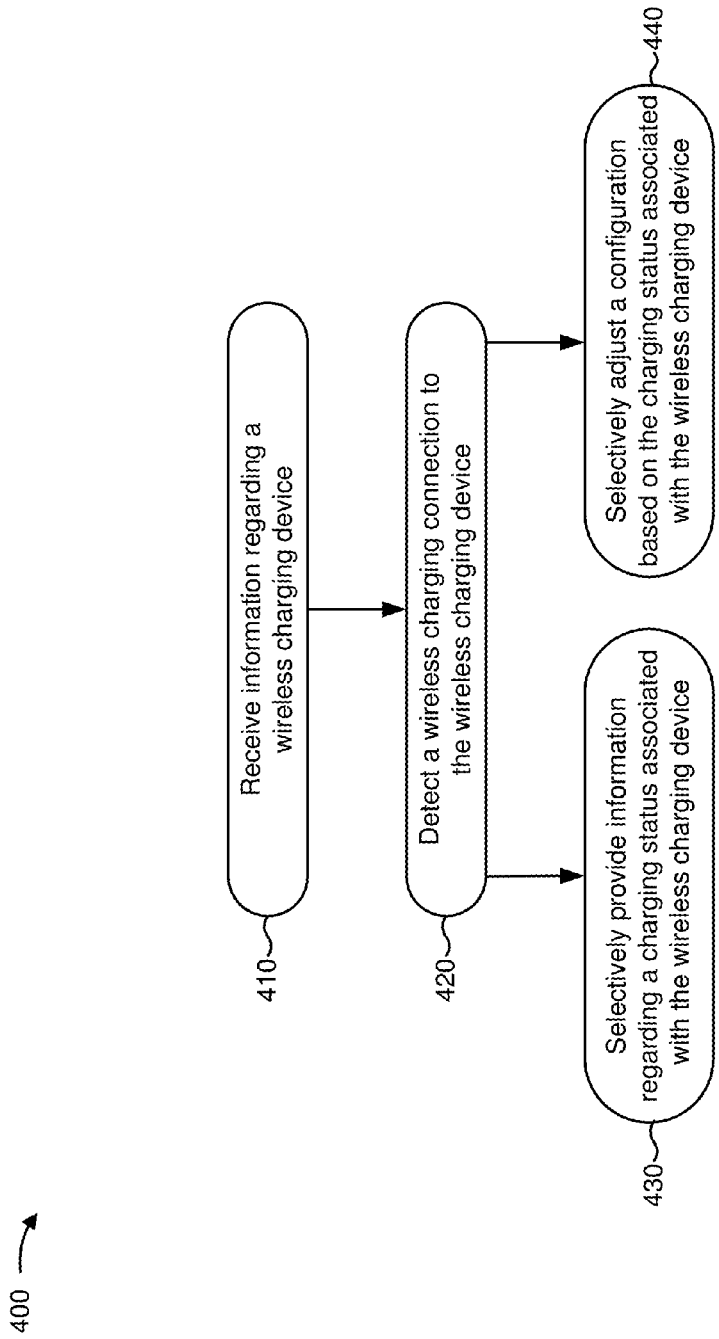
FIG. 4 is a flow chart of an example process for contextual assistance for wireless charging.

FIG. 4 is a flow chart of an example process 400 for contextual assistance for wireless charging. In some implementations, one or more process blocks of FIG. 4 may be performed by mobile device 205. Additionally, or alternatively, one or more process blocks of FIG. 4 may be performed by another device or a group of devices separate from or mobile device 205, such as base station 210, MME 215, SGW 220, PGW 225, HSS 230, AAA 235, and/or wireless charging device 240.

As shown in FIG. 4, process 400 may include receiving information regarding a wireless charging device (block 410). For example, mobile device 205 may receive information regarding wireless charging device 240. In some implementations, mobile device 205 may receive information identifying a location of wireless charging device 240. For example, mobile device 205 may determine that a battery level has satisfied a low-battery threshold, and may identify a location of wireless charging device 240. In this case, mobile device 205 may provide information to a user of mobile device 205, via a user interface, identifying the location of wireless charging device 240. In some implementations, mobile device 205 may identify the location of wireless charging device 240 based on a connection to wireless charging device 240. For example, mobile device 205 may receive information, transmitted from wireless charging device 240, identifying the location of wireless charging device 240 (e.g., based on requesting the information, based on performing ranging of a signal received from wireless charging device 240, or the like).

In some implementations, mobile device 205 may detect wireless charging device 240. For example, mobile device 205 may detect a beacon provided by wireless charging device 240. Additionally, or alternatively, mobile device 205 may detect an electromagnetic charging signal being provided by wireless charging device 240 (e.g., via an electromagnetic sensor that produces an electrical current based on being aligned with a magnetic or electric field). In this case, the electromagnetic sensor may include a straight portion, a coil portion, or the like that couple with wireless charging device 240 to charge mobile device 205, and which may be utilized to detect a proximity to wireless charging device 240.

Additionally, or alternatively, mobile device 205 may identify the location of wireless charging device 240 based on stored information. For example, mobile device 205 may provide, via a user interface, an option with which a user may store a location of wireless charging device 240, and may obtain the location from a data structure of mobile device 205. Additionally, or alternatively, mobile device 205 may receive, from a device of network 245, information identifying a set of locations of a set of wireless charging devices 240 within a particular proximity of mobile device 205. In this case, mobile device 205 may select wireless charging device 240, from the set of wireless charging devices 240, based on a proximity to wireless charging device 240, based on an availability of wireless charging device 240, or the like. In some implementations, mobile device 205 may facilitate sharing of a location of wireless charging device 240, and may identify the location based on sharing. For example, a first mobile device 205 may identify the location of wireless charging device 240 and may share the location with a second mobile device 205 (e.g., via a direct connection, via a data structure associated with storing locations, or the like). In this case, second mobile device 205 may access information identifying the location based on having received the location from first mobile device 205.

In some implementations, mobile device 205 may receive alignment information regarding wireless charging device 240. For example, when mobile device 205 satisfies a threshold proximity to wireless charging device 240, mobile device 205 may receive information indicating a directional adjustment (e.g., an alteration to a position of mobile device 205 in a particular direction, by a particular quantity of displacement, or the like) to be made to align mobile device 205 to wireless charging device 240. In this case, mobile device 205 may cause the information to be displayed via a user interface of mobile device 205. In some implementations, mobile device 205 may receive information identifying a type of wireless charging device 240, and may provide the alignment information based on the type. For example, mobile device 205 may provide, via a user interface, an image identifying a proper alignment position for mobile device 205 relative to wireless charging device 240 based on the type of wireless charging device 240.

As shown in FIG. 4, process 400 may include detecting a wireless charging connection to the wireless charging device (block 420). For example, mobile device 205 may detect the wireless charging connection to wireless charging device 240. In some implementations, mobile device 205 may detect the wireless charging connection based on initiating wireless charging. For example, when mobile device 205 is positioned on wireless charging device 240, mobile device 205 may detect the wireless charging connection based on detecting an increased battery level relative to a battery level of mobile device 205 prior to being positioned on wireless charging device 240. Additionally, or alternatively, mobile device 205 may detect the wireless charging connection based on establishing a local area connection with wireless charging device 240.

In some implementations, mobile device 205 may determine an alignment score based on the wireless charging connection. For example, mobile device 205 may determine a first alignment score when mobile device 205 is poorly aligned to wireless charging device 240 and a second alignment score when mobile device 205 is properly aligned to wireless charging device 240. In this case, mobile device 205 may provide, via the user interface, information identifying the alignment score and/or information indicating an improvement to charging efficiency based on altering a position of mobile device 205 from a current alignment to a new alignment.

As shown in FIG. 4, process 400 may include selectively providing information regarding a charging status associated with the wireless charging device (block 430). For example, mobile device 205 may selectively provide information regarding the charging status associated with wireless charging device 240. The charging status may refer to information associated with the wireless charging connection, such as information indicating that wireless charging is occurring/not occurring via the wireless charging connection, information identifying an efficiency of wireless charging, information identifying a charging level, or the like.

In some implementations, mobile device 205 may provide information regarding a charging level. For example, based on detecting the wireless charging connection to wireless charging device 240, mobile device 205 may provide information regarding a charging level of mobile device 205, an expected time to complete charging, or the like. In some implementations, mobile device 205 may provide the information via a user interface. For example, mobile device 205 may cause information regarding the charging status to be displayed via a user interface of mobile device 205. Additionally, or alternatively, mobile device 205 may cause the information to be displayed via another device, such as by transmitting the information (e.g., via network 245) to a set top box device for display via a display device.

Mobile device 205 may provide information regarding a change to the charging status, in some implementations. For example, mobile device 205 may provide information indicating that charging is complete. Additionally, or alternatively, mobile device 205 may provide information indicating that charging is interrupted. In some implementations, mobile device 205 may determine that charging is interrupted voluntarily. For example, mobile device 205 may determine, based on information obtained from a set of accelerometers associated with mobile device 205, that a rate at which mobile device 205 is moved from a proximity to wireless charging device 240 satisfies an acceleration threshold, a displacement threshold, or the like. In this case, mobile device 205 may suppress a warning regarding a cessation of charging based on determining that a user has voluntarily ceased charging by intentionally removing mobile device 205 from the proximity to wireless charging device 240. By contrast, when mobile device 205 determines that a threshold (e.g., the acceleration threshold, the displacement threshold, or the like) is not satisfied, mobile device 205 may determine that the movement was inadvertent (e.g., as a result of vibration causing mobile device 205 to become improperly aligned) and may provide an alert identifying the interruption to charging.

Additionally, or alternatively, mobile device 205 may provide an alert relating to a security situation. For example, a user may select a security mode of mobile device 205, and mobile device 205 may provide information based on a change to the charging status that occurs without the security mode being disabled. As an example, when another user removes mobile device 205 from a proximity to wireless charging device 240 without the security mode being disabled (e.g., by providing authorization information), mobile device 205 may detect a change in charging status (e.g., charging being disabled), and may perform one or more response actions, such as activating a tracking functionality (e.g., a global positioning system (GPS) based tracking functionality), preventing usage of mobile device 205, providing a notification to another device (e.g., a display device, a wearable device, etc.), or the like.

Mobile device 205 may suppress an alert based on the charging status, in some implementations. For example, when mobile device 205 detects the wireless charging connection to wireless charging device 240, mobile device 205 may suppress vibration alerts associated with mobile device 205 (e.g., incoming message alerts, charging status alerts, or the like) until charging is completed, thereby reducing a likelihood of mobile device 205 being moved to a poor alignment position while charging is occurring. Additionally, or alternatively, mobile device 205 may suppress an alert based on alarm clock information. For example, mobile device 205 may suppress an alert until an alarm feature of mobile device 205 is scheduled to be activated, until an alarm device separate from mobile device 205 is scheduled to be activated (e.g., determined based on a connection to the alarm device), or the like.

As further shown in FIG. 4, process 400 may include selectively adjusting a configuration based on the charging status associated with the wireless charging device (block 440). For example, mobile device 205 may selectively adjust the configuration based on the charging status associated with wireless charging device 240. In some implementations, mobile device 205 may adjust a configuration of wireless charging device 240. For example, when traveling along a route at a speed that satisfies a threshold and based on detecting the wireless charging connection to wireless charging device 240, mobile device 205 may cause wireless charging device 240 to alter an attachment to mobile device 205 (e.g., a magnetic attachment or the like). In this way, mobile device 205 may reduce a likelihood that vibrations (e.g., from a train moving, a car moving, or the like) cause mobile device 205 to be moved into a poor alignment with wireless charging device 240. Additionally, or alternatively, mobile device 205 may reduce the magnetic attachment from a first attachment level (e.g., a first power level). For example, when the charging status indicates that mobile device 205 is no longer charging, mobile device 205 may cause wireless charging device 240 to reduce the magnetic attachment to a second attachment level (e.g., a second power level), thereby reducing power consumption relative to maintaining the magnetic attachment at the first power level.

In some implementations, mobile device 205 may adjust a configuration of mobile device 205. For example, when mobile device 205 receives a notification from wireless charging device 240 (e.g., based on a light switch associated with wireless charging device 240 being turned to off) indicating a do not disturb mode (e.g., a mode that may be utilized at night to avoid a disturbance to a user), mobile device 205 may alter a configuration of mobile device 205 to silence one or more notifications, delay one or more notifications, or the like, thereby reducing a likelihood of disturbing the user during the night. As another example, based on time information, location information, or the like, mobile device 205 may determine to enter the do not disturb mode and/or disable one or more notifications.

In some implementations, mobile device 205 may adjust the configuration of mobile device 205 based on a security mode. For example, when mobile device 205 is operating in a security mode and the charging status indicates that the wireless charging connection to wireless charging device 240 is severed, mobile device 205 may disable operation of mobile device 205, enable location services for mobile device 205 (e.g., to facilitate tracking mobile device 205), or the like. In this way, mobile device 205 may facilitate recovery of mobile device 205 and/or reduce the likelihood of theft of mobile device 205 when mobile device 205 is charging relative to another mobile device 205 lacking the security mode.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of contextual assistance for wireless charging.

Figure 5A:
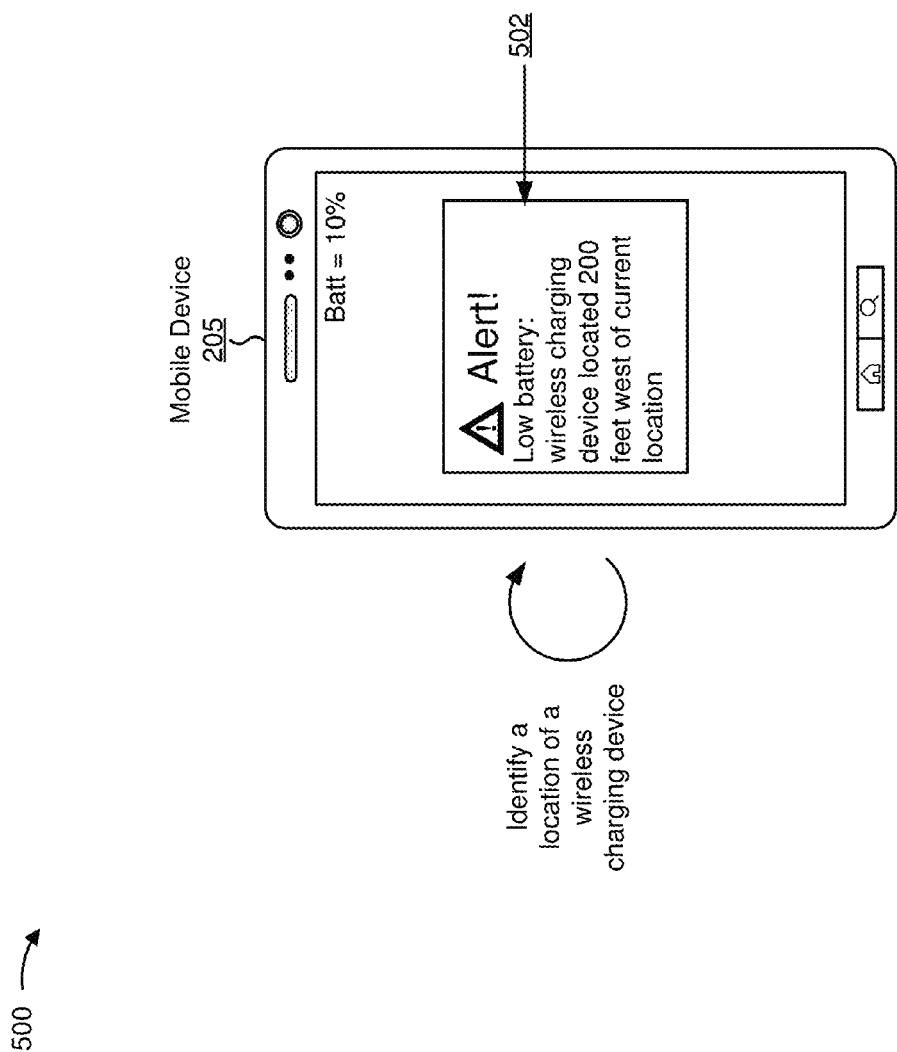
FIGS. 5A-5F are diagrams of an example implementation relating to the example process shown in FIG. 4.

As shown in FIG. 5A, and by reference number 502, mobile device 205 determines that a low-battery threshold is satisfied and provides a notification, via a user interface, of a particular wireless charging device 240 at a particular location (e.g., "200 feet west") relative to mobile device 205. In this way, mobile device 205 may provide contextual charging assistance to a user by identifying a location of wireless charging device 240, thereby assisting the user in ensuring that mobile device 205 remains adequately charged for utilization.

Figure 5B:
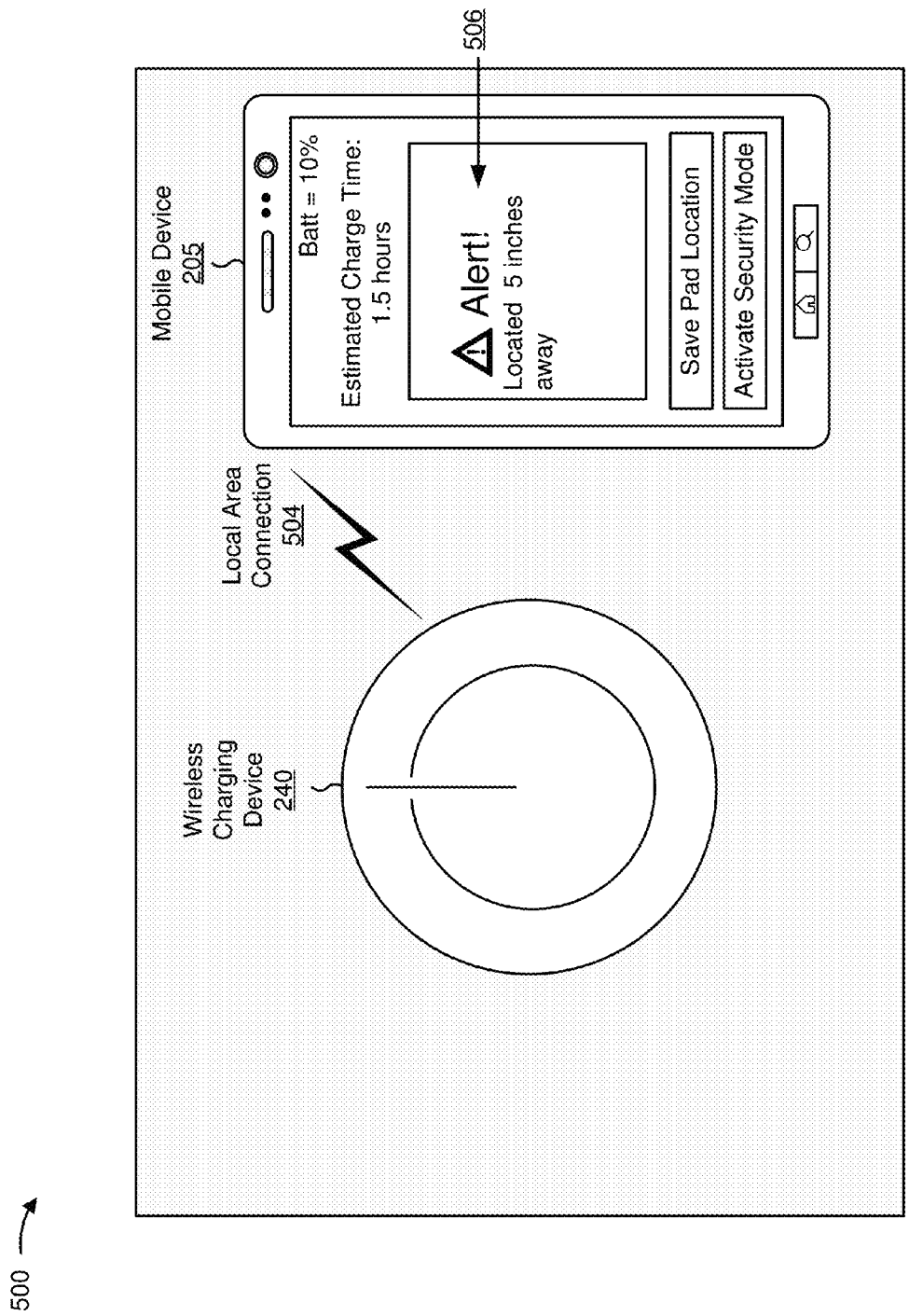

As shown in FIG. 5B, based on being moved within a threshold proximity of wireless charging device 240, mobile device 205 establishes a local area connection 504 with a wireless charging device 240. Mobile device 205 utilizes signal ranging (e.g., estimating a distance based on a signal strength, a signal response time, or the like) associated with local area connection 504 to provide contextual information to the user indicating a proximity to wireless charging device 240. In this way, mobile device 205 provides contextual charging assistance by identifying a proximity to wireless charging device 240, thereby assisting the user in locating wireless charging device 240, such as when wireless charging device 240 is hidden, poorly marked (e.g., wireless charging device 240 may be incorporated into another device or object and may be indicated by a difficult to find identifier), or the like.

Figure 5C:
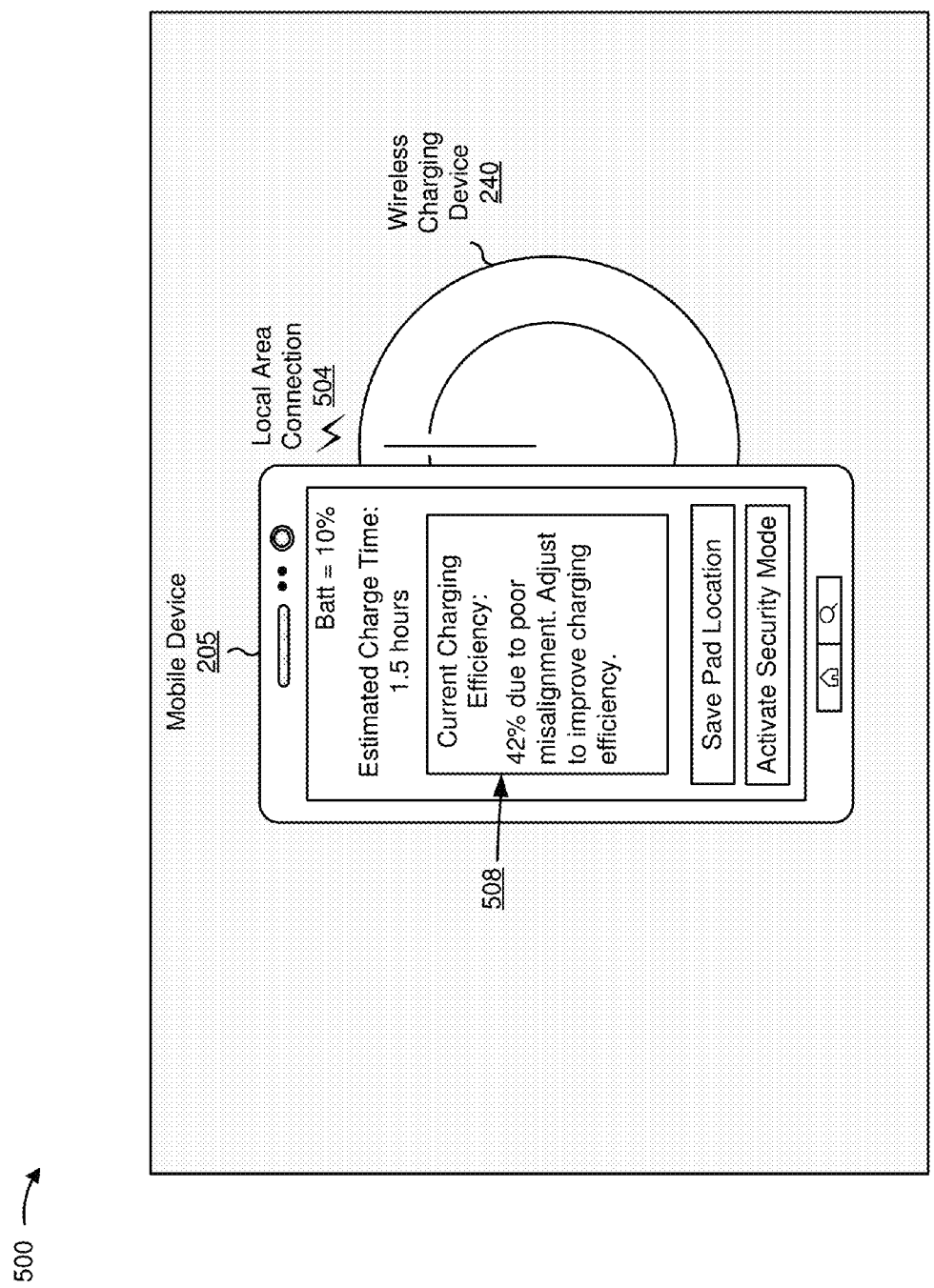

As shown in FIG. 5C, and by reference number 508, mobile device 205 determines a charging efficiency for a wireless charging connection with wireless charging device 240 and provides information associated with the wireless charging connection (e.g., information identifying a charging status). The information identifies a relatively poor alignment of mobile device 205 to wireless charging device 240 and indicates that the alignment is improvable by adjusting mobile device 205. In this way, mobile device 205 may provide contextual charging assistance by identifying a charging efficiency, thereby facilitating a proper alignment of mobile device 205 and wireless charging device 240 and reducing charging time, power consumption, or the like relative to a poor alignment. In another example, mobile device 205 may provide an image of mobile device 205 and wireless charging device 240 in a proper alignment to facilitate the user matching the image to achieve the proper alignment.

Figure 5D:
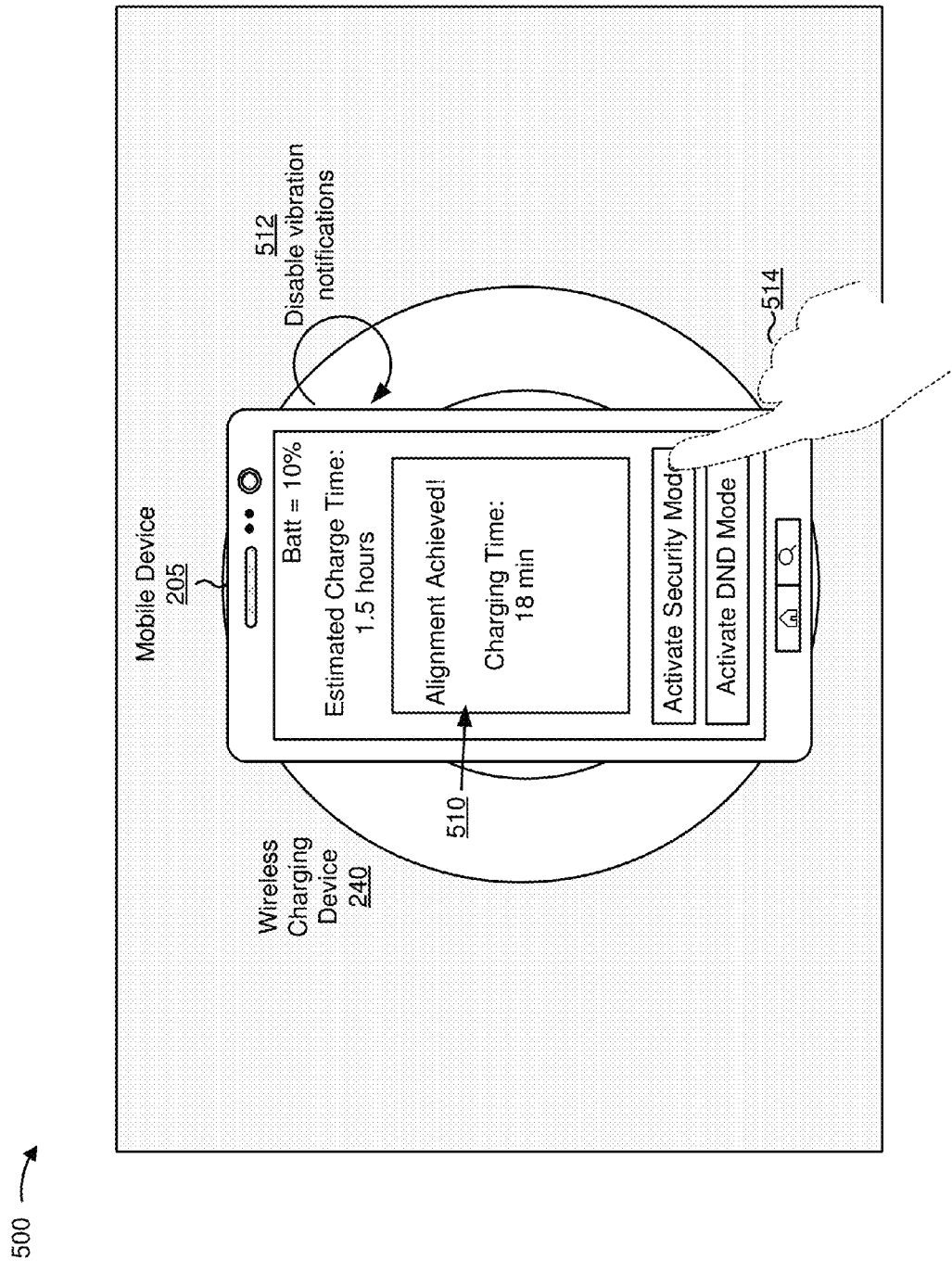

As shown in FIG. 5D, and by reference number 510, mobile device 205 provides information indicating that mobile device 205 is properly aligned with wireless charging device 240, and that mobile device 205 is charging. Based on a charging status of mobile device 205 (e.g., that mobile device 205 is charging), mobile device 205 alters a configuration to disable vibration notifications, thereby reducing a likelihood that a particular vibration notification interrupts charging, causes mobile device 205 to become poorly aligned with wireless charging device 240, or the like. In this way, mobile device 205 may alter a configuration based on a charging status to reduce a likelihood of a charging interruption, thereby reducing charging time, energy consumption, or the like relative to another mobile device 205 that experiences one or more charging interruptions. As shown by reference number 514, based on a user interaction with a button of a user interface of mobile device 205, mobile device 205 activates a security mode.

Figure 5E:
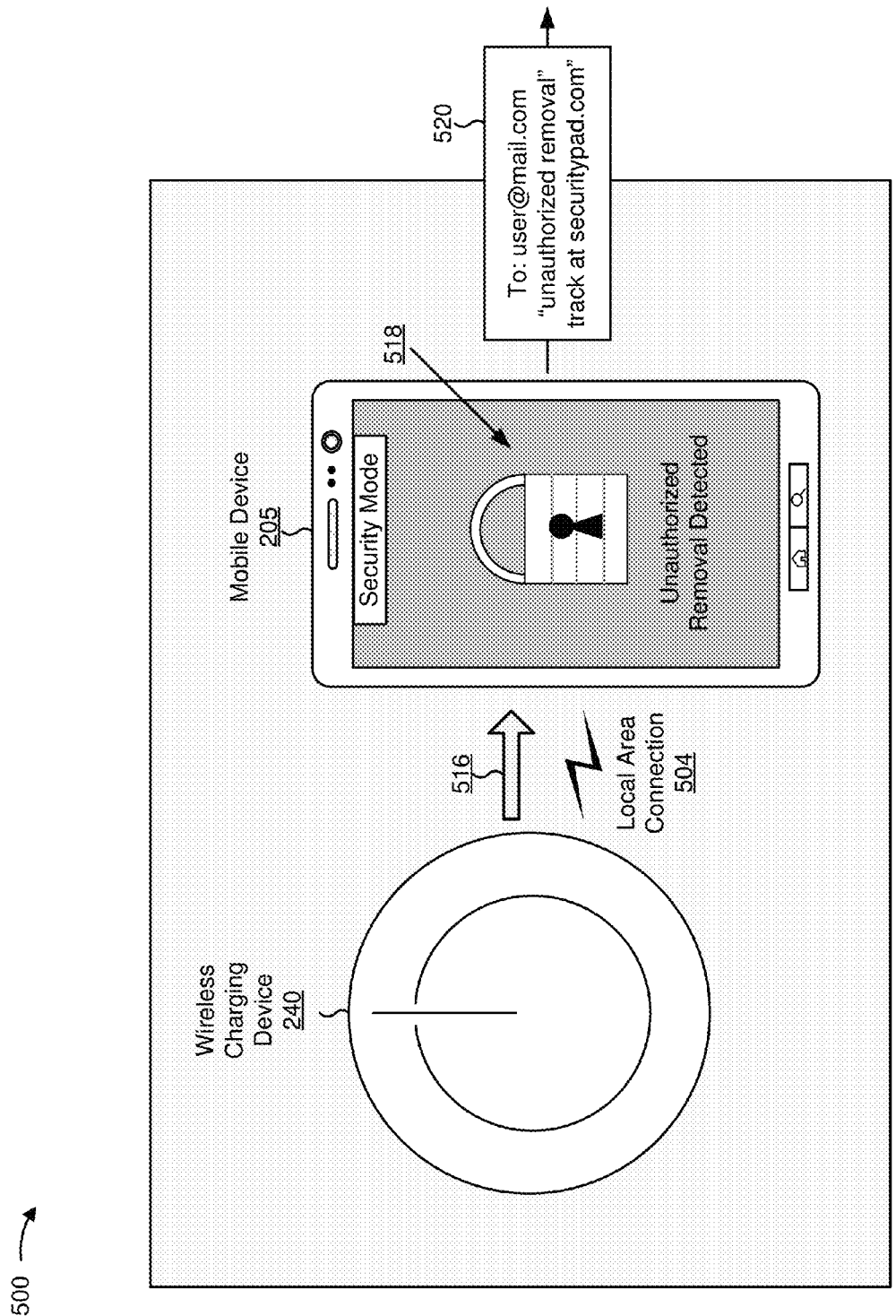

As shown in FIG. 5E, and by reference number 516, mobile device 205 is moved away from wireless charging device 240 (e.g., by a user not authorized to remove mobile device 205) while the security mode is activated. Assume that moving mobile device 205 causes a change to the charging status (e.g., charging is disabled). As shown by reference number 518, mobile device 205 detects an unauthorized removal of mobile device 205 based on the change to the charging status. As shown by reference number 520, mobile device 205 provides information indicating an occurrence of the unauthorized removal and facilitating tracking of mobile device 205 (e.g., providing information associated with accessing GPS information associated with mobile device 205). In another example, mobile device 205 may provide an audible alert, activate a camera (e.g., to take a picture for location identification, to take a picture for facial recognition, etc.), or the like. In this way, mobile device 205 may utilize information regarding a charging status of a wireless charging connection with wireless charging device 240 to reduce a risk of theft and/or increase a likelihood of recovery relative to another mobile device 205 that does not alter a configuration and/or provide a notification based on a change to a charging status.

Figure 5F:
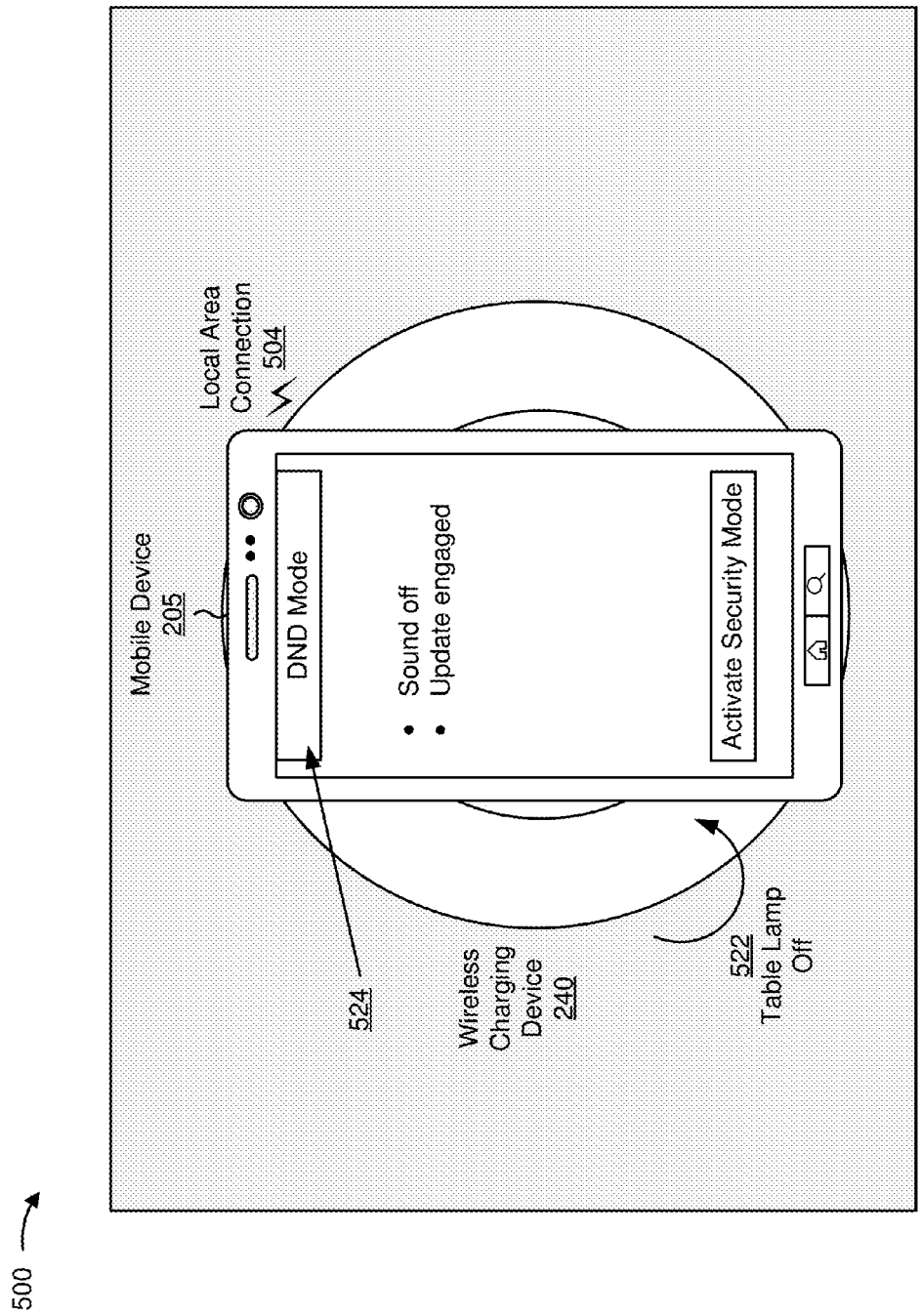

As shown in FIG. 5F, in another example, mobile device 205 remains aligned with wireless charging device 240. Assume that a table lamp is integrated into a table in which wireless charging device 240 is incorporated. Further assume that the table lamp is turned off and information is provided to wireless charging device 240 indicating that the table lamp is turned off. As shown by reference number 522, wireless charging device 240 provides information to mobile device 205 indicating that the table lamp is turned off via local area connection 504. As shown by reference number 524, based on receiving the information, mobile device 205 adjusts a configuration to enter a do not disturb (DND) mode (e.g., a night mode that includes disabling audio notifications, disabling visual notifications, updating software, or the like). In this way, mobile device 205 may improve user experience by decreasing a likelihood of disturbance from an audio notification when a user turns off a light to go to sleep. Moreover, mobile device 205 may improve network performance by scheduling an update at night when network usage is low relative to during daytime.

As indicated above, FIGS. 5A-5F are provided merely as an example. Other examples are possible and may differ from what was described with regard to FIGS. 5A-5F.

Figure 6:
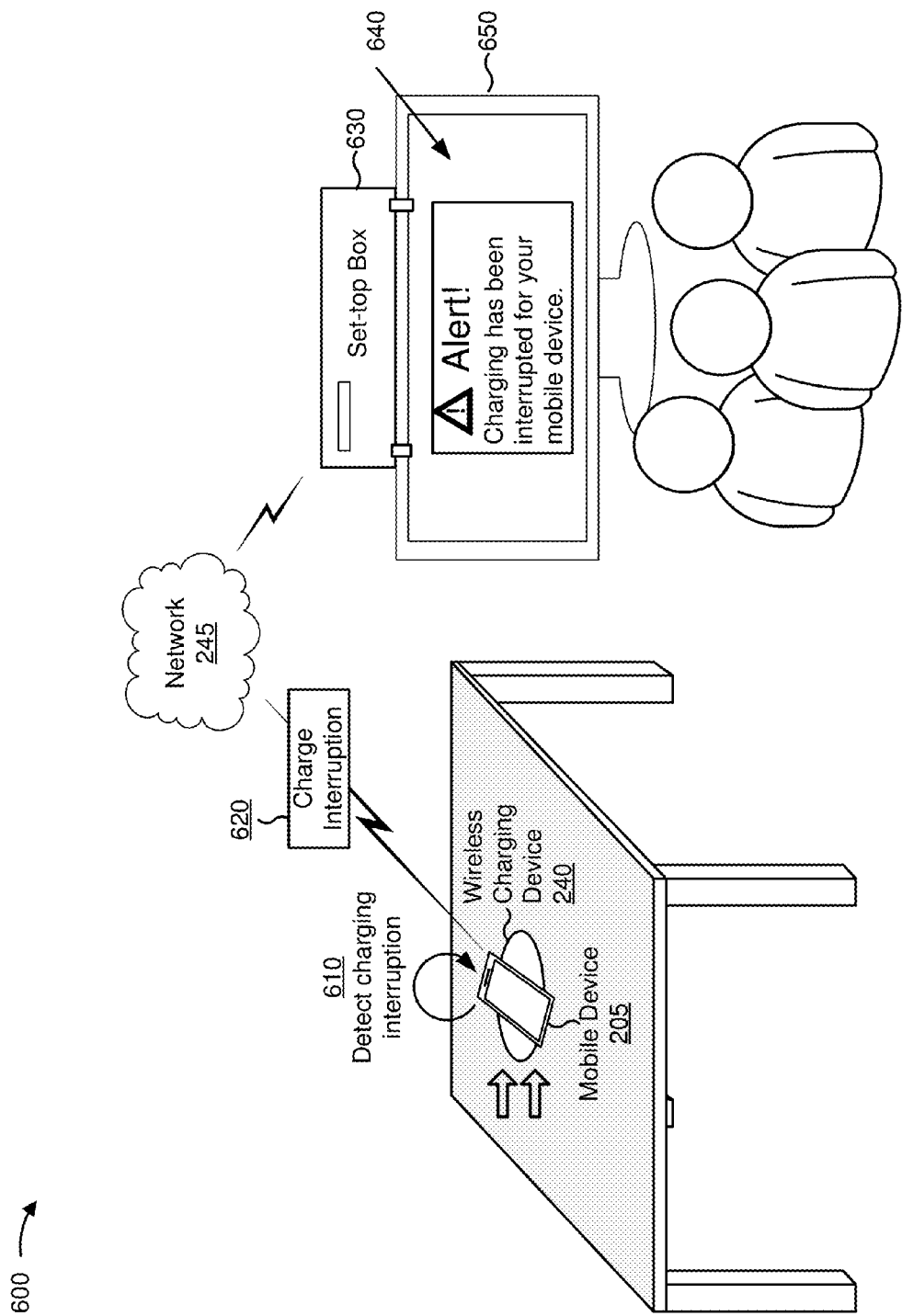
FIG. 6 is a diagram of another example implementation relating to the example process shown in FIG. 4.

FIG. 6 is a diagram of an example implementation 600 relating to example process 400 shown in FIG. 4. FIG. 6 shows an example of contextual assistance for wireless charging.

As shown in FIG. 6, mobile device 205 is positioned in alignment with wireless charging device 240 on a table. Assume that mobile device 205 is moved (e.g., based on the table vibrating), causing a change in charging status (e.g., disabling charging of mobile device 205). As shown by reference number 610, mobile device 205 detects the change in charging status. As shown by reference number 620, mobile device 205 provides a notification to set-top box 630 (e.g., via network 245). As shown by reference number 640, the notification is provided for display via display device 650 by set-top box 630. The user may adjust mobile device 205 to resume charging based on being provided the notification. In this way, mobile device 205 may facilitate providing a notification regarding charging status to a user in another room, to a user watching television, or the like.

As indicated above, FIG. 6 is provided merely as an example. Other examples are possible and may differ from what was described with regard to FIG. 6.

Figure 7:
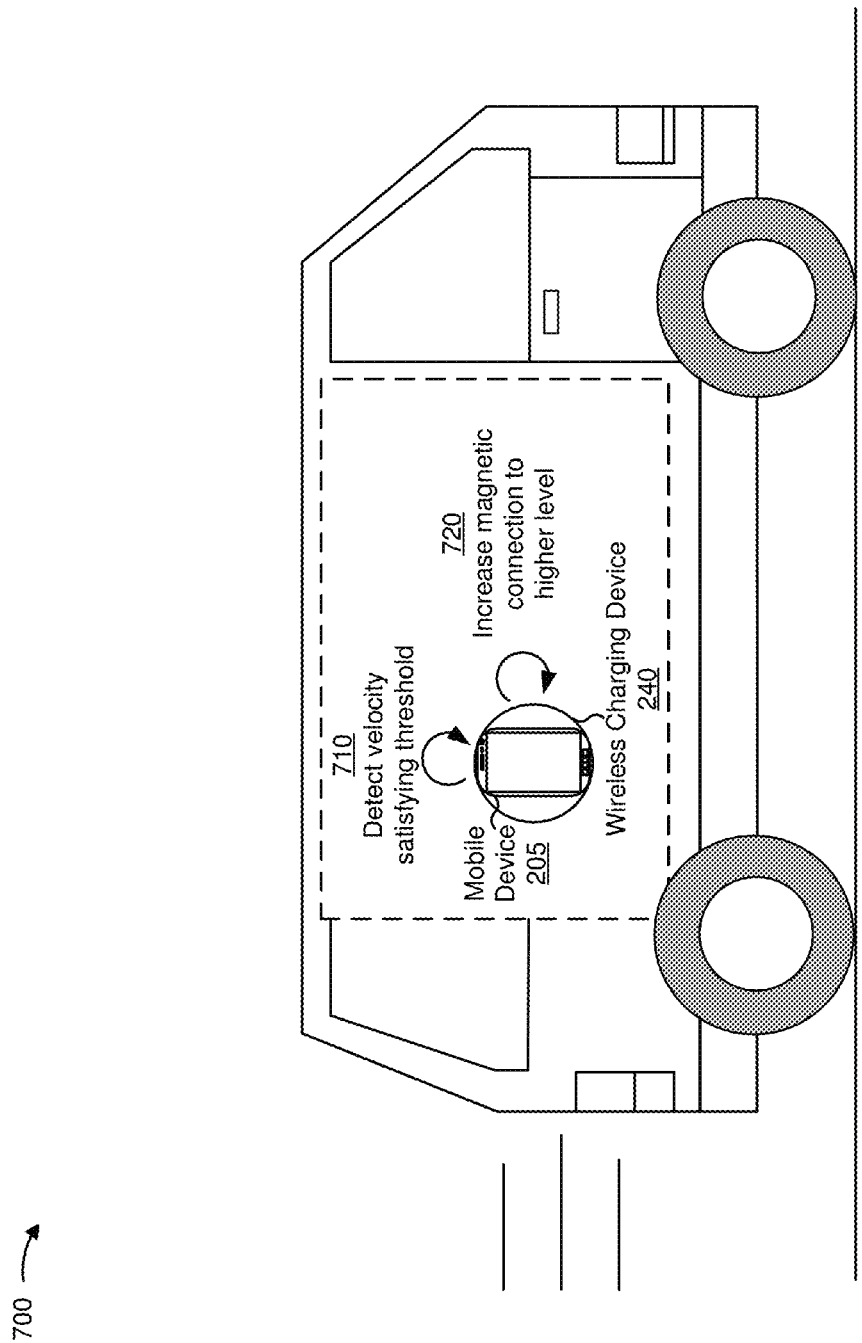
FIG. 7 is a diagram of another example implementation relating to the example process shown in FIG. 4.

FIG. 7 is a diagram of an example implementation 700 relating to example process 400 shown in FIG. 4. FIG. 7 shows an example of contextual assistance for wireless charging.

As shown in FIG. 7, mobile device 205 is positioned in alignment with wireless charging device 240 in a moving automobile. As shown by reference number 710, mobile device 205 determines that a velocity threshold is satisfied by the moving automobile (e.g., based on GPS information, accelerometer information, or the like). As shown by reference number 720, mobile device 205 provides information to wireless charging device 240 instructing wireless charging device 240 to increase a magnetic connection to a higher level relative to a current level. In this way, mobile device 205 may reduce a likelihood of a charging interruption.

As indicated above, FIG. 7 is provided merely as an example. Other examples are possible and may differ from what was described with regard to FIG. 7.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive a trigger to identify a wireless charging device for performing wireless charging,
   the trigger being generated when a battery level satisfies a low-battery threshold;
   select the wireless charging device from a set of wireless charging devices,
   the set of wireless charging devices being identified based on stored information regarding one or more locations of one or more wireless charging devices or a beacon identifying one or more locations of one or more wireless charging devices;
   determine a location of the wireless charging device;
   provide information identifying the location of the wireless charging device and/or information associated with performing an alignment with the wireless charging device,
   the alignment being associated with facilitating wireless charging of the device via the wireless charging device, and
   the information associated with performing the alignment including information that, when rendered for display via a user interface of the device, instructs a proper alignment of the device and the wireless charging device;
   detect a wireless charging connection between the device and the wireless charging device; and
   disable one or more vibration notifications based on detecting the wireless charging connection between the device and the wireless charging device.

2. The device of claim 1, where the one or more processors are further to:
   provide, for display via a display device, information regarding a charging status of the wireless charging connection based on detecting the wireless charging connection between the device and the wireless charging device.

3. The device of claim 1, where the one or more processors, when providing information identifying the location of the wireless charging device and/or information associated with performing the alignment with the wireless charging device, are to:

provide, for display via the user interface, an image illustrating the proper alignment with the wireless charging device.

4. The device of claim 1, where the one or more processors, when providing information identifying the location of the wireless charging device and/or information associated with performing the alignment with the wireless charging device, are to:
provide, for display via the user interface, information associated with indicating an adjustment to a position of the device to facilitate the proper alignment.

5. The device of claim 1, where the one or more processors, are further to:
determine that the device has been moved by a quantity satisfying a threshold,
the threshold being associated with indicating a voluntary cessation of charging,
a notification regarding a cessation of charging being suppressed based on the quantity satisfying the threshold.

6. The device of claim 1, where the one or more processors are further to:
detect a change to a charging status associated with wireless charging via the wireless charging device; and
provide information identifying the change to the charging status.

7. The device of claim 1, where the one or more processors are further to:
detect a threshold change to a proximity between the device and the wireless charging device,
the threshold change occurring without receiving authorization information associated with the threshold change; and
provide information identifying the threshold change to the proximity between the device and the wireless charging device.

8. The device of claim 1, where the one or more processors are further to:
detect an electromagnetic signal produced by the wireless charging device,
the electromagnetic signal being associated with, when the device is aligned to the wireless charging device, charging the device.

9. A computer-readable medium storing instructions, the instructions comprising:
one or more instructions that, when executed by one or more processors of a device, cause the one or more processors to:
receive a trigger to identify a wireless charging device for performing wireless charging,
the trigger being generated when a battery level satisfies a low-battery threshold;
detect a wireless charging connection between the device and the wireless charging device,
the wireless charging connection being associated with a charging status of the device;
identify a change to the charging status of the device;
provide, for display via a user interface of the device, information identifying the change to the charging status of the device; and
disable one or more vibration notifications based on detecting the wireless charging connection between the device and the wireless charging device.

10. The computer-readable medium of claim 9, where the one or more instructions, when executed by the one or more processors, further cause the one or more processors to:
provide, for display via the user interface of the device, information associated with illustrating a proper alignment of the device and the wireless charging device.

11. The computer-readable medium of claim 10, where the one or more instructions, when executed by the one or more processors, further cause the one or more processors to:
identify a type of the wireless charging device;
select, from a set of images illustrating a set of proper alignments for a set of wireless charging devices, a particular image illustrating the proper alignment of the device and the wireless charging device based on the type of the wireless charging device; and
where the one or more instructions, that cause the one or more processors to provide information associated with illustrating the proper alignment, cause the one or more processors to:
provide the particular image for display.

12. The computer-readable medium of claim 10, where the one or more instructions, when executed by the one or more processors, further cause the one or more processors to:
receive information indicating a directional adjustment to an alignment of the device with regards to the wireless charging device,
the directional adjustment being associated with achieving the proper alignment; and
where the one or more instructions, that cause the one or more processors to provide information associated with illustrating the proper alignment, cause the one or more processors to:
provide information identifying the directional adjustment.

13. The computer-readable medium of claim 9, where the one or more instructions, when executed by the one or more processors, further cause the one or more processors to:
receive information associated with entering a do not disturb mode; and
adjust a configuration of the device to enter the do not disturb mode,
the do not disturb mode including silencing one or more audible notifications, relating to the charging status, associated with the device.

14. The computer-readable medium of claim 9, where the one or more instructions, when executed by the one or more processors, further cause the one or more processors to:
provide information to the wireless charging device associated with causing the wireless charging device to increase an attachment level with which the wireless charging device prevents an alteration to an alignment with the device.

15. The computer-readable medium of claim 9, where the one or more instructions, when executed by the one or more processors, further cause the one or more processors to:
provide, for display via the user interface, information indicating whether the device is properly aligned with the wireless charging device.

16. A method, comprising:
receiving, by a device, a trigger to identify to a wireless charging device within a threshold proximity to the device,
the trigger being generated when a battery level satisfies a low-battery threshold;
providing, by the device, information associated with aligning the device and the wireless charging device,
the information associated with aligning the device including information that, when rendered for display via a user interface of the device, instructs a proper alignment of the device and the wireless charging device;

determining, by the device, that a wireless charging connection is enabled with the wireless charging device based on providing information associated with aligning the device and the wireless charging device,
the device being charged by the wireless charging device;

determining, by the device, a charging status associated with the wireless charging connection;

providing, by the device, information identifying the charging status; and disable one or more vibration notifications based on detecting the wireless charging connection between the device and the wireless charging device.

17. The method of claim 16, where providing the information identifying the charging status comprises:
providing the information, via a network, for display via a display device.

18. The method of claim 16, where providing information associated with aligning the device and the wireless charging device comprises:
providing information identifying the proper alignment,
the proper alignment being associated with a more efficient wireless charging connection relative to an improper alignment.

19. The method of claim 16, where providing information associated with aligning the device and the wireless charging device comprises:
determining a current alignment of the device and the wireless charging device,
the current alignment not being the proper alignment;
determining an adjustment to the current alignment,
the adjustment being associated with achieving the proper alignment; and
provide information associated with identifying the adjustment.

20. The method of claim 16, further comprising:
detecting an electromagnetic signal produced by the wireless charging device,
the electromagnetic signal being associated with, when the device is aligned to the wireless charging device, charging the device.

* * * * *